United States Patent [19]
Potter et al.

[11] Patent Number: 5,829,152
[45] Date of Patent: Nov. 3, 1998

[54] INTEGRATED MEASURING AND MARKING SYSTEM

[75] Inventors: Michael D. Potter, Grand Isle; Kathleen M. Dever, Jonesville, both of Vt.

[73] Assignee: Anza Corporation, Richmond, Vt.

[21] Appl. No.: 849,253

[22] PCT Filed: Aug. 16, 1996

[86] PCT No.: PCT/US96/13385

§ 371 Date: Jan. 29, 1997

§ 102(e) Date: Jan. 29, 1997

[87] PCT Pub. No.: WO97/14541

PCT Pub. Date: Apr. 24, 1997

Related U.S. Application Data

[60] Provisional application No. 60/005,154 Oct. 16, 1995.

[51] Int. Cl.$^6$ ............................... B25H 7/04; G01B 3/10
[52] U.S. Cl. ............................. 33/668; 33/678; 33/760; 33/768
[58] Field of Search ............................. 33/668, 678, 760, 33/768, 1 N, 39.1, 42, 751, 770, 579

[56] References Cited

U.S. PATENT DOCUMENTS

| | | | |
|---|---|---|---|
| 1,529,293 | 3/1925 | Beulwitz | 33/678 |
| 2,575,354 | 11/1951 | Mills | 33/767 |
| 2,581,858 | 1/1952 | Hilt et al. | 33/768 |
| 2,624,120 | 1/1953 | Mills | 33/668 |
| 3,205,584 | 9/1965 | Overaa | 33/760 |
| 3,731,389 | 5/1973 | King | 33/668 |
| 3,802,083 | 4/1974 | Freed | 33/668 |
| 4,015,337 | 4/1977 | Taylor | 33/668 |
| 4,296,554 | 10/1981 | Hammerstrom | 33/32.5 |
| 4,439,927 | 4/1984 | Elliott | 33/668 |
| 4,542,589 | 9/1985 | Yamamoto | 33/760 |
| 4,580,347 | 4/1986 | McKnight | 33/760 |
| 4,630,376 | 12/1986 | Pentecost | 33/760 |
| 4,667,412 | 5/1987 | Calson | 33/760 |
| 4,729,171 | 3/1988 | Samson | 33/760 |
| 4,965,941 | 10/1990 | Agostinacci | 33/668 |
| 5,020,235 | 6/1991 | Martin | 33/668 |
| 5,416,978 | 5/1995 | Kaufman | 33/770 |
| 5,435,074 | 7/1995 | Holevas et al. | 33/668 |
| 5,477,619 | 12/1995 | Kearns | 33/668 |

FOREIGN PATENT DOCUMENTS

| | | |
|---|---|---|
| 63-212801 | 9/1988 | Japan . |
| 2172109 | 9/1986 | United Kingdom . |

*Primary Examiner*—Thomas B. Will
*Attorney, Agent, or Firm*—Theodore R. Touw

[57] ABSTRACT

An integrated system for measuring and marking on a surface (110) has a housing (15, 80), a measuring element (40) at least partially contained within the housing, and a marking element (60) for marking the surface. The system is characterized in that the marking element is initially retained within the housing (80) and is maintained in a spaced-apart relationship to the surface until a user moves the housing in a predetermined direction relative to the surface, whereupon the surface is marked at the measured point. The predetermined direction is preferably perpendicular toward the surface, and the marking element preferably operates through an aperture (70) in the bottom surface of the housing. Various embodiments have features including a cursor (30) aligned with which the marking element, a modular removable and replaceable marking element (60), and either a linear measuring tape or an arcuate angle-measuring element (40).

29 Claims, 2 Drawing Sheets

INTEGRATED MEASURING AND MARKING SYSTEM

A U.S. Provisional Patent Application titled "Meter Mark Measuring and Marking System" describing this invention was filed in the United States Patent and Trademark Office on Oct. 16, 1995 and given Ser. No. 60/005,154.

TECHNICAL FIELD OF THE INVENTION

This invention relates generally to measuring instruments and marking devices. More particularly, it relates to marking apparatus integrated with and activated by a housing of a measuring instrument to mark an article being measured.

BACKGROUND OF THE INVENTION

The process of making a measurement and marking an article according to the measurement can be time consuming and can be subject to inaccuracies. The present invention is aimed at improving both efficiency and accuracy of measurement and marking.

BACKGROUND ART

A number of patents have described markers associated with measuring instruments. U.S. Pat. No. 2,649,787 to Kobayashi discloses a scratch marker attached below the point where a tape measure exits its case. U.S. Pat. Nos. 2,807,886 and 3,148,455 to Aciego disclose pencil and tape holders that clamp onto a tape measure case and allow marking with an inserted pencil. U.S. Pat. No. 3,063,157 to Keene discloses a marker that attaches to a tape measure case and may be folded up into a slot at the back of the case when not in use. U.S. Pat. No. 3,262,211 to Beckett discloses a marking device attached to a folding measuring tape or to a tape measure case. U.S. Pat. No. 3,336,678 to Chamberlain et al. discloses a marking attachment for a coiled measuring tape, which attaches to the tape measure case like a C-clamp and has a spring-loaded pin with a marking point at its lower end. U.S. Pat. No. 3,731,389 to King discloses a tape measuring device with a spring-loaded marking mechanism within the casing at the end opposite the end at which the tape is withdrawn. Markings on the tape are read through a window and are arranged to correspond to the distance between the marking element and the free end of the tape.

U.S. Pat. No. 3,802,083 to Freed shows a marker and stop accessory for extensible measuring tapes, which is mounted on the tape casing adjacent to the tape-issuing opening. A spring-mounted marking element is depressed to mark the article being measured, and a pointer engages the tape to indicate the length of issued tape as well as to arrest any further movement of the tape. U.S. Pat. No. 3,885,314 to Banas, Sr. discloses a two-way tape and centering device with two measuring tapes extensible in opposite directions, located in separate compartments of a single housing. An inscribing device projects through the housing between the two tape measures. A spring maintains the inscribing device in a raised position with the tip enclosed in the housing until the shaft is depressed to make a mark. U.S. Pat. No. 4,015,337 to Taylor shows a combined tape measure and marking device with a spring-loaded arm pivotally supported from one side of the tape measure housing. The forward end of the arm supports an alignment arrow and marking device. The marking device is manually actuated after the alignment arrow is aligned with the desired graduation. When the arm is released, the arm automatically assumes a position where the marking device is out of contact with the measured article, and the marking quill retracts to a concealed position where it will not further mark the article measured. U.S. Pat. No. 4,296,554 to Hammerstrom discloses a tape measure with a spring clip for attaching the tape to a belt of clothing and also for receiving and positioning a pencil or scribing tool, aligned precisely with the point of exit of the tape from the housing. U.S. Pat. No. 4,439,927 to Elliott shows a tape measure with a casing which also contains a consumable marker and a scriber disposed immediately forward of and alongside the slot through which the coiled tape is withdrawn. Either the marker or scriber may be positioned via manual actuating means to mark an object being measured. A brake is automatically activated when either the marker or the scriber is positioned for marking. The brake can also be activated without marking. A plurality of feed segments compensate for diminishing length of the marker with use.

U.S. Pat. No. 4,542,589 to Yamamoto discloses a marker which may be contained in a tape measure case, mounted on the side, or mounted on the top of the case. In use, the marker is projected to mark a desired point on the surface to be measured. In one embodiment this is accomplished by tilting the tape measure case about one of its corners. U.S. Pat. No. 4,630,376 to Pentecost shows an internally-mounted marking device for a tape measure with a spring-loaded member allowing the user to mark the surface of a workpiece immediately beneath the tape measure. U.S. Pat. No. 4,965,941 to Agostinacci discloses a combination marker and tape measure having a pair of markers which may be used to mark a surface on each side of a flexible tape. A plunger knob is depressed into a recess formed on a declining front face of the housing to move the markers between a retracted configuration and an extended configuration. A locking mechanism formed on a plunger permits selective locking of the tape. A guide foot removably mounted on an end tab enables marking of a line parallel to an edge of a surface. U.S. Pat. No. 5,020,235 to Martin shows a layout device for locating a wall-mounted item at a specified distance from a reference point such as a floor. The device includes a bracket which is removably mounted to a measuring tape. A level attached to the bracket indicates vertical alignment of both the extended tape and the item which is to be installed. The bracket includes protrusions which form indentations marking the measured location when the bracket is forced against the wall surface.

U.S. Pat. No. 5,435,074 to Holevas et al. discloses a tape measure and marking device having a locking mechanism, disposed on the front side of its housing, adjacent to a marker housing containing a marker. The locking mechanism is linked to the marker and a scribe through a lever arm. When the locking mechanism is pressed down, the lever arm drives the marker outside the marker housing, exposing the tip of the marker. Further movement of the locking mechanism moves it into a locked position whereby the measuring tape is fixed after the user releases the locking mechanism. Thus, in the Holevas et al. device, both locking and marking are actuated by manually operating the locking mechanism.

U.S. Pat. No. 5,477,619 to Kearns shows a tape measure marking attachment that includes a generally cylindrically shaped housing for holding a marking utensil. A mechanism is included integral with the housing for releasably locking the marking utensil within the housing.

PROBLEMS SOLVED BY THE INVENTION

When a carpenter or other worker makes a measurement, there is often a need to reach for a marking pencil or the like to make a mark on an article being measured and then to store the marking implement away for the next use. The operations of measuring, reaching for a marking implement, marking, and storing usually require separate discrete motions and corresponding times. By providing an integrated measurement and marking system, this invention allows measurement and marking to be accomplished in one simple, fluid, uninterrupted motion with consistently high accuracy, thereby eliminating wasted time and reducing marking inaccuracy. By providing a marking mechanism completely independent of any tape-measure locking mechanism, the invention allows marking without locking the measuring element, and allows locking the measuring element without marking.

PURPOSES, OBJECTS, AND ADVANTAGES OF THE INVENTION

Major purposes of the invention include accurate and efficient marking of a surface being measured. A major object of the invention is an integrated measuring and marking system that provides for marking of a measured article at the same time that an article is measured. Another object is a marking device aligned with a measuring device. A related object is a marking device whose alignment with a measuring device is adjustable. Another important object is an integrated system whose marking function is activated by moving its housing. A particular related object is an integrated measuring and marking system whose marking function is actuated by moving its housing with respect to the surface of an article being measured. An object related to the accuracy of such a device is a system whose marking action is actuated by moving its housing perpendicularly with respect to the surface. Another object is an integrated measuring and marking system including a cursor for indicating position. Yet another object is a measuring and marking system that is independent of a measure-locking function, and is operable without a mechanism for locking. Another object is an integrated measuring and marking system including a marking device that is easily replaceable by a user. A related object is an integrated measuring system adaptable for marking various materials using various marking methods and various marking devices. More specific objects include an integrated marking tape measure and an integrated marking protractor.

DISCLOSURE OF THE INVENTION

An integrated measuring and marking system includes a housing and a measuring element (typically an extensible measuring tape retractably coiled within the housing). This measuring element is wholly or partially contained within the housing. A cursor is preferably attached to the housing to indicate a position of the housing with respect to the measuring element. The cursor may include a magnifier. A marking element for marking the surface of the item to be measured is connected to the upper portion of the housing and aligned with the cursor, but the marking element is kept spaced from the surface until the housing is moved with respect to the surface by the user, to mark the surface. The direction of motion of the housing that actuates the marking is preferably perpendicular to the surface being measured, i.e. the user preferably exerts a force downward on the housing, perpendicularly toward the surface. The marking element part of the system is preferably removable and/or replaceable. The marking element may include a quantity of marking material, such as ink, pencil lead (graphite), chalk, dye, light-sensitive material, soapstone, crayon, wax (colored or uncolored), pigment, paint, or mixtures, compounds, or composites of those materials. Another type of marking element is an indentor, such as a hard metal point for making an indentation mark in a relatively softer material. Alternatively, the marking element may mark a surface with electromagnetic radiation, such as visible, ultraviolet, or infrared light, or x-rays, when used on a surface sensitive to such radiation. In those cases, the marking element includes a suitable light source, such as a laser. Other alternative embodiments may use a heat source, which may be a laser or electrical resistance element, for example, for marking a surface sensitive to heat. Still other marking elements that may be used in the system are pens, sprayers, or ink jets. The pens may be of any type, such as ball-point, felt-tip or fountain pens, depending on the application. Visual or audible feedback may be used to inform the user that a mark is being made on the surface being measured.

The measuring system of this invention may be used for the type of measurement in which a dimension (or angle etc.) is unknown and is to be determined, but it is especially useful for the type of measurement in which a desired dimension is known, and a surface of an article is to be marked at that desired dimension, to prepare the article for a subsequent operation, such as cutting or grinding.

In a typical use of the measuring system, a measuring tape is extended until the cursor is aligned to a desired graduation for the position to be measured, and the housing is depressed toward the surface, where the marking element makes a mark. Springs or the like move the housing back away from the surface when the housing is released. When not compressed, the springs maintain the marking element spaced away from the surface being measured. The marking portion may include a mark-blocking feature, to prevent inadvertent marking. The mark-blocking feature may be released by a release trigger mechanism, for example, to allow marking.

The measurement and marking may both be accomplished in one smooth motion without changing the position of the hand holding the housing, as it is the motion of the housing with respect to the surface being measured that actuates the marking. Since no additional steps or finger motions are required to advance or retract the marking element, or to engage or disengage a tape-locking mechanism linked to the marking, the measurement process is faster and more efficient than heretofore.

BEST MODE FOR CARRYING OUT THE INVENTION

In one aspect, the invention is an integrated system for measuring and marking on a surface. The system has a housing, a measuring element at least partially contained within the housing, and a marking element for marking the surface. The system of the present invention is characterized in that the marking element is retained within the housing and is maintained in a spaced-apart relationship to the surface until a user moves the housing in a predetermined direction relative to the surface, whereupon the surface is marked.

The invention will be described primarily in terms of an embodiment made for linear measurements. In this particular embodiment the invention includes a marking apparatus for tape measures. The marking apparatus can be built integrally into a new tape measure, or can be implemented as an attachment, to be attached to existing tape measures. It is used to mark articles when they are measured to a predetermined dimension, e.g. a board to be sawed to a specific length. Other embodiments made for angular measurements are also disclosed, as are embodiments made for marking various materials by using various marking devices adapted to the present invention.

Figure 1:
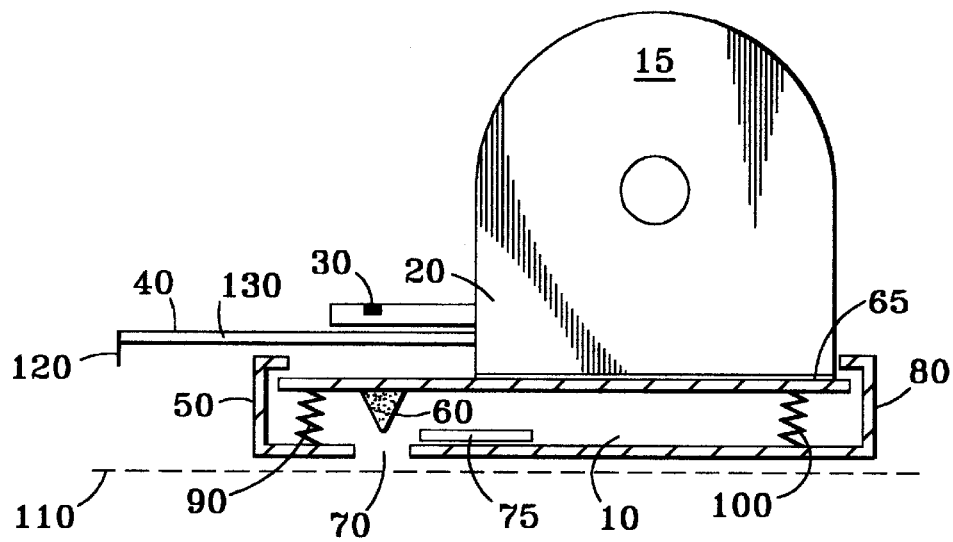
FIG. 1 shows a partially cut away schematic side elevation view of an integrated linear measuring and marking system made in accordance with the invention.

FIG. 1 shows a simple embodiment of an integrated linear measuring and marking system made in accordance with the invention, in a schematic side elevation view, partially cut away to show internal elements.

The marking portion 10 of the system has two sections which are aligned vertically, connected to each other and to the tape measure housing 15. Top section 20 has a cursor 30 extending across the upper face of tape 40 and indicating the position of the tape with respect to the housing 15. Cursor 30 may include, for example, a line engraved or printed on a transparent window formed of any transparent material, or one or two cantilevered arrows pointing inward at the edges of the tape. Cursor 30 may also include a magnifier such as a magnifying lens (which may be a Fresnel lens). As is well-known in the measurement art, the function of cursor 30 may also be enhanced in precision by inclusion of a set of conventional vernier indicia (not shown in the drawings). Lower or bottom portion 50 encloses a marking element 60, e.g. a pen or stamp which may be a point or line marker, aligned with cursor 30 and with a hole 70 below it, in a casing 80. Marking element 60 is attached to top section 20 of housing 15. The bottom portion 50 has resilient connection means 90 and 100 such as springs that hold top section 20 up with the marking element 60 away from the surface 110 being measured while the tape is extended to the desired measurement point. Thus bottom portion 50 is movable with respect to top portion 20. When the measurement is made (from the end 120 of tape 40 to cursor 30), the user momentarily applies a force downward on the tape measure housing 15 to mark the surface with marking element 60. The end 120 of tape 40 may include a conventional end hook, which may be of the "true zero" type that slidably compensates for the hook's thickness when used for inside measurements. Hole 70 may be closed by a cover 75 adjacent to the bottom surface, for covering the marking element 60 when it is not being used. Cover 75 may be manually operable, such as a sliding door, or may be normally closed and be arranged to open automatically when housing is depressed, using conventional cams or levers, for example (not shown).

Marking element 60 can be a hard point (e.g. hard steel, silicon carbide, or diamond) for making a dimple-like indentation mark in a surface that is softer than the indenting point. Depending on such variables as the purpose of the measurement and the nature of the surface to be marked, marking element 60 may be any conceivable marking means. For example, if the surface to be marked were a thermoplastic material, a mark could be made by a source of heat, such as an electrical resistance element, a heating lamp, or a laser. If the surface were sensitive to electromagnetic radiation, the marking device can be a source of electromagnetic radiation, such as a semiconductor device, a field-emission device, a light-emitting diode, a laser, a phosphor, a source of visible light, a source of x-rays, a source of ultraviolet light, or a source of infrared light. If the marking element is one of a type that makes a material mark on surface 110, the marking material may be, for example, ink, pencil lead, chalk, dye, light-sensitive material, soapstone, crayon, wax, pigment, paint, or any suitable mixture, compound, or composite of those marking materials. For particular applications, marking element 60 may include, for example, a sprayer such as a paint sprayer, an ink jet such as those used in conventional ink-jet printers, or an ultrasonic vibrator such as those used in ultrasonic drills. For markers that require power for their operation, housing 15 can contain suitable batteries or means for connecting to an external supply of power.

Thus, in general, the invention is an integrated system for measuring and marking on a surface 110, combining a housing 15, some measuring means 40 at least partially contained within housing 15, and a marking element 60 for marking surface 110. The system preferably also includes a cursor 30 attached to housing 15 to indicate a position of housing 15 with respect to measuring means 40. The marking element 60 is connected to and supported by support 65, which is preferably contained within housing 15, in at least partial alignment with cursor 30. Preferably, marking element 60 is removably attached to housing 15. The alignment of marking element 60 with respect to cursor 30 is preferably made adjustable. Conventional arrangements for adjusting alignment of one mechanical element with another are well-known in the art and are therefore not shown in the drawings. Marking element 60 is preferably disposed adjacent to the bottom surface of housing 15. Marking element 60 is kept away from surface 110 with an intervening space until housing 15 is moved relative to surface 110, thus marking surface 110 when marking element 60 contacts surface 110. The system may include one or more means (such as resilient connection means or e.g. springs 90 and 100), to maintain the marking element spaced apart from surface 110 until a user moves housing 15 appropriately. In the simple embodiment of FIG. 1, surface 110 is marked when housing 15 is moved (preferably perpendicularly) toward surface 110. However, in other embodiments, a mechanical arrangement using a lever or cam, for example, may be made to impel marking element 60 toward surface 110 for marking it, upon moving the housing in some other manner relative to surface 110. In certain of these arrangements, the lateral position of housing 15 relative to surface 110 is accurately maintained, and parallax is avoided, by actuating the marking function by motion perpendicular to surface 110. Preferably, the marking is not actuated when housing 15 is merely moved away from surface 110, for that direction of motion of the housing would tend to produce unintended marks during incomplete measurements. However, it will be recognized that any of the degrees of freedom of the housing (such as lateral translation, tilting of the housing in roll, pitch, or yaw, etc. or even twisting or squeezing a suitably flexible housing) may be used in various embodiments to actuate the marking process.

Lower portion 50 is retained in approximate alignment to upper portion 20 of housing 15 by conventional mechanical design features. In a simple embodiment, the upper portion 20 has a peripheral groove extending around adjacent to its lower surface, and lower portion 50 has a rim extending inward adjacent to its top edge, the rim being complementary to the groove and engaging the groove to retain the two portions together.

The system also preferably provides a visual and/or audible indication that surface 110 is being marked. Feedback indicating that a mark has been transferred is helpful to the user. A visible indication may be provided by a distinctively colored flag actuated by the marking mechanism, for example, and visible through an opening or transparent window in housing 15. An audible indication that surface 110 is being marked can be provided, for example, by a concave metallic disk actuated by the marking mechanism. The disk makes a clicking sound when its concave and convex sides are mechanically switched. In more complex measurement systems, either the visible or audible indicators or both may be conventional electrically-actuated indicators such as buzzers, loudspeakers, lamps, light-emitting diodes, and the like.

Figure 2:
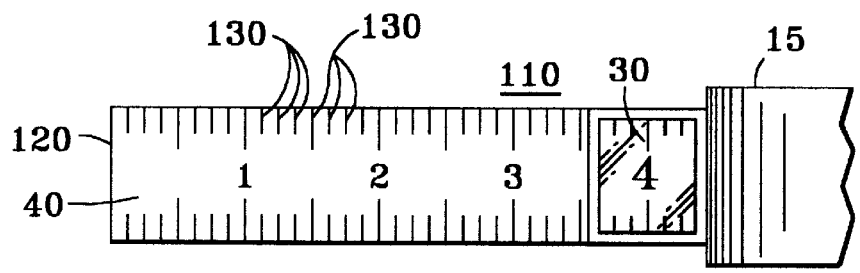
FIG. 2 shows a top partial view of the linear measuring and marking system of FIG. 1, showing details.

If the system is intended for performing a linear measurement, the measuring means 40 includes linear graduations 130 to be read at cursor 30. Such a linear measurement system typically includes a tape measure tape or blade retractably coiled within housing 15, as in FIGS. 1, 2, and 4.

Figure 3:
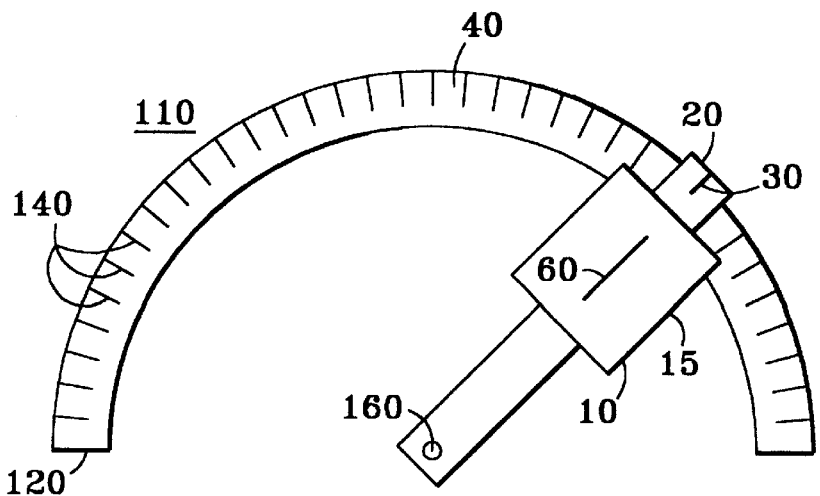
FIG. 3 shows a schematic plan view of an integrated angular measuring and marking system made in accordance with the invention.

If the system is intended for performing an angular measurement, the measuring means 40 includes angular graduations 140 to be read at cursor 30, as shown in FIG. 3. FIG. 3 shows a schematic plan view of an integrated angular measuring and marking system. In such an angular measurement system, the measuring means 40 typically comprises a protractor. In an angle-measuring version of the invention, marking element 60 makes a mark such as a line, indicative of an angle measured about an axis 160 from a reference direction at end 120 of the measuring element 40. It will be apparent that marking element 60 may be outside the protractor arc, instead of inside as shown in the drawing. As in the embodiments for linear measurement, the function of cursor 30 may be enhanced in precision by inclusion of a set of conventional vernier indicia (not shown in the drawings).

Figure 4:
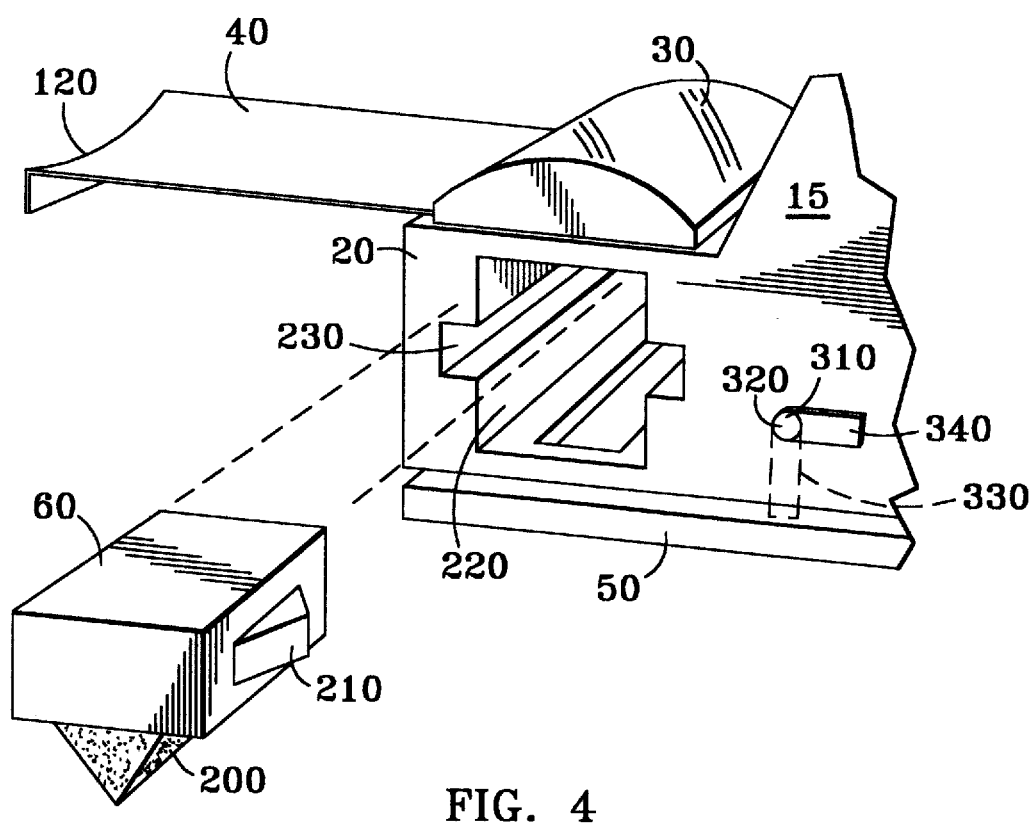
FIG. 4 shows a perspective view illustrating a detail of an embodiment having removable and replaceable modular marking means.

FIG. 4 shows a detail of a preferred embodiment having a removable and replaceable modular marking element. Many of the marking materials listed herein may be provided in this removable and replaceable modular cartridge form. A modular form of marking element 60, which may be molded of plastic for economical production, holds a marking feature 200 composed of the marking material. Marking element 60 is inserted into an aperture 220 in housing 15. Alignment members 210 on either side of marking element 60 fit through slots 230 in the sides of aperture 220, and engage alignment detents (not shown) inside aperture 220. The alignment detents are of a size and complementary shape to receive alignment members 210. Lower portion 50 of the apparatus has an aperture through which marking feature extends (only when housing 15 is depressed). This aperture in the lower portion 50, aperture 220, and slots 230 are all mutually centered, and aligned with respect to housing 15, in order to provide a mark at the proper location on surface 110. In particular, if there is a cursor 30, these elements are centered on a centerline extending directly downward through the center of cursor 30. While it is convenient to have a snap-in type of cartridge, the marking element may be held by other means, such as a removable pin from the front or side of the housing, passing through the marking element, or may be held by a spring element that is deflected by a user in order to insert or remove the cartridge. Another type or retaining mechanism that is applicable in some designs is the type using a ball bearing in a socket, held in a retaining position by a spring. Aperture 220 may be covered with a cover, such as a sliding door, when the modular marking element is not being changed.

In various alternative embodiments, the removable and replaceable modular marking element may include a user-releasable latching mechanism, (such as a spring-loaded latch molded of plastic similar to the latching tab of an RJ-11 modular telephone jack) and, if needed, a separate tab, lever, or trigger mechanism arranged to release the latching mechanism.

It is often desirable to prevent inadvertent marking. A system that can prevent inadvertent marking preferably includes a mechanism for releasably locking the marking element "up" (i.e. away from surface 110). This mechanism can have a release element for releasing the locking mechanism and allowing the marking element to operate for marking. One embodiment of the locking feature is illustrated in FIG. 4. An L-shaped lever 310 pivots around an axis 320. Inside housing 15, an inner lever arm 330 extends downward next to lower section 50 when lever 310 is in the locked position, preventing upper portion 20 from being depressed. Outside lever arm 340 is moved by a user (e.g. counterclockwise from the locked position illustrated in FIG. 4) to rotate inner lever arm 330 toward a horizontal orientation to unlock the marker. There are many alternate conventional means for locking that may be used, such as the safety used to prevent firing of a gun, or the lock on the power trigger of a power tool. Many such locking mechanisms use levers, slides, or cams moved into and out of a position for interfering with a motion by using a handle, trigger, or buttons.

Taking the tape measure embodiment of FIG. 1 as exemplary of the use of the invention: to use the invention, a user extends the measuring tape 40 from housing 15 until a desired measurement for surface 110 (as measured from tape end 120) is indicated by graduations 130 aligned at cursor 30. The user applies a force to housing 15 to momentarily move the housing relative to surface 110, whereby marking element 60 makes a mark on surface 110. This combined measurement and marking operation may be accomplished in one simple, fluid, uninterrupted motion with consistently high accuracy, and repeated as many times as there are measurements to be made.

INDUSTRIAL APPLICABILITY

The integrated measuring and marking system of this invention has many uses, including simultaneous measuring and marking of surfaces, particularly according to linear and angular measurements made to mark a surface for a subsequent operation, such as cutting. The system may be used in various fields of endeavor, such as carpentry, machining, sewing or tailoring of garments, etc.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. Other embodiments of the invention will be apparent to those skilled in the art from a consideration of this specification or from practice of the invention disclosed herein. For example, graduations of the measuring means may comprise sinusoidal or other periodic optical or magnetic signals on a suitable tape, or marking may be achieved by a magnetic tape recording head, a rotating knife or saw blade, etc. For another example, the housing of the invention may be made in one piece if at least a portion of the housing is flexible enough to allow a user to depress the top portion containing the measuring and marking elements relative to the bottom portion. It is intended that the specification and examples be considered as exemplary only, with the true scope and spirit of the invention being defined by the following claims.

Having described our invention, we claim:

1. An integrated system for measuring and marking on a surface, having a housing, measuring means at least partially contained within said housing, and marking means for marking said surface, said system being characterized in that: said marking means is supported by a support, said support being connected to said housing, said marking means is maintained in a spaced-apart relationship from a base, said base being resiliently connected to said support by resilient connection means, and said marking means is maintained in a spaced-apart relationship from said surface until a user moves said housing relative to said surface in a direction substantially perpendicular to said surface, whereupon said marking means extends outward beyond said base to mark said surface.

2. An integrated system for measuring and marking on a surface as recited in claim 1, wherein said marking means is enclosed within said base until moved outward beyond said base to mark said surface.

3. An integrated system for measuring and marking on a surface, having measuring means at least partially contained within a housing, said system comprising:
   a) marking means for marking said surface, said marking means being disposed in at least partial alignment with said housing;
   b) a support connected to said housing and to said marking means for supporting said marking means;
   c) resilient connection means connected to said housing; and
   d) a base resiliently connected to said housing by said resilient connection means; said base being disposed to maintain said marking means in a spaced-apart relationship from said surface until said housing is moved substantially perpendicular relative to said surface, such that said marking means is moved outward beyond said base to mark said surface.

4. A system as in claim 3, further comprising:
   e) cursor means attached to said housing to indicate a position of said measuring means relative to said housing.

5. A system as in claim 3, wherein said marking means (a) comprises a quantity of marking material.

6. A system as in claim 3 wherein said at least partial alignment is adjustable.

7. A system as in claim 3, further comprising means for releasably locking said marking means to prevent inadvertent marking.

8. A system as in claim 3 wherein said marking means (a) is replaceable.

9. A system as in claim 3, wherein said housing has a bottom surface, and said marking means (a) is disposed adjacent to said bottom surface of said housing.

10. A system as in claim 3, wherein said measuring means comprises linear graduations for performing a linear measurement.

11. A system as in claim 3, wherein said measuring means comprises angular graduations for performing an angular measurement.

12. A system as in claim 3, further comprising means for providing a visual indication that said surface is being marked.

13. A system as in claim 3, further comprising means for providing audible indication that said surface is being marked.

14. A system as in claim 3, wherein said marking means (a) comprises means for making an indentation in said surface.

15. A system as in claim 3, wherein said resilient connection means comprises one or more springs.

16. A system as in claim 4, wherein said cursor means (e) comprises a magnifier.

17. A system as in claim 5, wherein said marking material is selected from the list consisting of:
   ink, pencil lead, chalk, dye, light-sensitive material, soapstone, crayon, wax, pigment, paint, and mixtures, compounds, and composites thereof.

18. A system as in claim 7, further comprising a trigger for releasing said means for releasably locking said marking means.

19. A system as in claim 8, wherein said housing has a slot for receiving and holding said marking means, and said marking means (a) further comprises:
   (i) a removable cartridge fitting within said slot and having means for aligning said cartridge relative to said housing; and
   (ii) a quantity of marking material at least partially contained within said removable cartridge.

20. A system as in claim 9, further comprising a cover for covering said marking means, said cover being disposed adjacent to said bottom surface of said housing.

21. A system as in claim 10, wherein said measuring means comprises a tape measure retractably coiled within said housing.

22. A system as in claim 11, wherein said measuring means comprises a protractor and wherein said marking means (a) is adapted to mark said surface with a mark indicative of a measured angle.

23. A system as in claim 19, wherein said means for aligning said cartridge relative to said housing comprises a detent in at least one of said cartridge and said housing.

24. A system as in claim 20, wherein said cover is adapted to be manually opened and closed.

25. A system as in claim 20, wherein said cover is normally closed, and further comprising means for opening said cover automatically when said housing is moved relative to said surface.

26. An integrated tape measure system for measuring and marking on a surface, comprising:
   a) a housing having a bottom surface and having a slot adjacent to said bottom surface;
   b) tape measure means retractably coiled within said housing;
   c) cursor means attached to said housing to indicate a position of said tape measure means relative to said housing;
   d) a removable cartridge fitting within said slot of said housing;
   e) means for aligning said removable cartridge relative to said cursor;
   f) a quantity of marking material for marking said surface, said marking material being at least partially contained within said removable cartridge;
   g) one or more resilient connection means connected to said housing; and
   h) a base resiliently connected to said housing by said resilient connection means, said base being disposed to maintain said cartridge and said marking material in a spaced-apart relationship from said surface until a user moves said housing in a direction substantially perpendicular relative to said surface, whereby said surface is marked.

27. An integrated tape measure system as recited in claim 26, wherein said one or more resilient connection means comprises at least one spring.

28. An integrated protractor system for measuring and marking on a surface, comprising:
   a) a housing having a bottom surface and having a slot adjacent to said bottom surface;
   b) arcuate angular scale means at least partially retained by said housing;
   c) cursor means attached to said housing to indicate a position of said arcuate angular scale means relative to said housing;
   d) a removable cartridge fitting within said slot of said housing;
   e) means for aligning said removable cartridge relative to said cursor;
   f) a quantity of marking material for marking said surface, said marking material being at least partially contained within said removable cartridge;
   g) one or more resilient connection means connected to said housing; and
   h) a base resiliently connected to said housing by said resilient connection means, said base being disposed to maintain said cartridge and said marking material in a spaced-apart relationship from said surface until a user moves said housing in a direction substantially perpendicular relative to said surface, whereby said surface is marked.

29. An integrated protractor system as recited in claim 28, wherein said one or more resilient connection means comprises at least one spring.

* * * * *